(12) United States Patent
Sandler et al.

(10) Patent No.: US 12,487,582 B2
(45) Date of Patent: Dec. 2, 2025

(54) SYSTEMS AND METHODS FOR CONDITION-BASED DEPLOYMENT OF CHAINABLE COMPUTE OPERATIONS FOR CONSTRAINED COMPUTING DEVICES

(71) Applicant: Rockwell Automation Technologies, Inc., Mayfield Heights, OH (US)

(72) Inventors: Nathaniel S. Sandler, Chagrin Falls, OH (US); Christopher W. Como, Chagrin Falls, OH (US); Todd A. Wiese, Hubertus, WI (US); James M Teal, New Brunswick, NJ (US); Michael J. Anthony, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 578 days.

(21) Appl. No.: 17/955,114

(22) Filed: Sep. 28, 2022

(65) Prior Publication Data

US 2024/0103493 A1    Mar. 28, 2024

(51) Int. Cl.
G05B 19/4155    (2006.01)

(52) U.S. Cl.
CPC ............ G05B 19/4155 (2013.01); *G05B 2219/31368* (2013.01)

(58) Field of Classification Search
None
See application file for complete search history.

(56) References Cited

U.S. PATENT DOCUMENTS

| | | | |
|---|---|---|---|
| 9,256,467 B1* | 2/2016 | Singh | G06F 9/5055 |
| 9,794,287 B1* | 10/2017 | Koster | G06F 21/552 |
| 10,715,388 B2 | 7/2020 | Fildebrandt et al. | |
| 11,182,206 B2 | 11/2021 | Jung et al. | |

(Continued)

FOREIGN PATENT DOCUMENTS

| | | |
|---|---|---|
| KR | 20200027783 A | 3/2020 |
| WO | 2020184362 A1 | 9/2020 |

OTHER PUBLICATIONS

Extended European Search Report for European Patent Application No. 21179775.8, dated Nov. 25, 2021, 9 pages.

(Continued)

*Primary Examiner* — Charles E Anya
(74) *Attorney, Agent, or Firm* — Fletcher Yoder, P.C.

(57) ABSTRACT

A non-transitory computer readable medium stores instructions that cause a processor to receive an indication of an event associated with an industrial automation system, wherein the industrial automation system includes a plurality of devices configured to perform a plurality of operations within the industrial automation system, and wherein each of the plurality of devices includes a compute surface configured to perform one or more software tasks, determine a plurality of data processing tasks to perform based on the event, identify a portion of the plurality of devices to perform the plurality of data processing tasks based on the compute surface available for each of the plurality of devices, and deploy a container to each of the portion of the plurality of devices, wherein each container of each of the portion of the plurality of devices is configured to perform at least one of the plurality of data processing tasks.

18 Claims, 6 Drawing Sheets

(56) References Cited

U.S. PATENT DOCUMENTS

| | | | |
|---|---|---|---|
| 11,474,873 B2 | 10/2022 | Biernat et al. | |
| 11,513,877 B2 | 11/2022 | Biernat et al. | |
| 2013/0212129 A1* | 8/2013 | Lawson | G05B 11/01 707/779 |
| 2016/0350173 A1* | 12/2016 | Ahad | H04L 67/02 |
| 2017/0142203 A1* | 5/2017 | Zhang | G06F 8/60 |
| 2018/0024537 A1 | 1/2018 | Chauvet et al. | |
| 2018/0054469 A1 | 2/2018 | Simoncelli | |
| 2019/0042378 A1* | 2/2019 | Wouhaybi | H04L 67/125 |
| 2019/0101884 A1* | 4/2019 | Miller | G06F 9/542 |
| 2019/0340048 A1* | 11/2019 | Brown | G06F 11/0724 |
| 2019/0377604 A1 | 12/2019 | Cybulski | |
| 2020/0136906 A1 | 4/2020 | Bernat et al. | |
| 2020/0249928 A1 | 8/2020 | Zeng et al. | |
| 2020/0278892 A1 | 9/2020 | Nainar et al. | |
| 2020/0311617 A1 | 10/2020 | Swan et al. | |
| 2020/0320034 A1* | 10/2020 | Stawikowski | G06F 9/5055 |
| 2020/0401089 A1* | 12/2020 | McLaughlin | G06F 9/4881 |
| 2021/0021619 A1 | 1/2021 | Smith et al. | |
| 2021/0048998 A1* | 2/2021 | Myers | G06F 8/63 |
| 2021/0089354 A1 | 3/2021 | Nixon et al. | |
| 2021/0200814 A1 | 7/2021 | Tal et al. | |
| 2021/0218617 A1 | 7/2021 | Palavalli et al. | |
| 2021/0303365 A1* | 9/2021 | Li | G06F 9/5066 |
| 2021/0382727 A1 | 12/2021 | Vigil et al. | |
| 2022/0012149 A1* | 1/2022 | Doshi | G06F 8/65 |
| 2022/0027217 A1 | 1/2022 | Thoemmes et al. | |
| 2022/0091572 A1 | 3/2022 | Biernat et al. | |
| 2022/0171648 A1 | 6/2022 | Rodriguez et al. | |
| 2022/0308859 A1* | 9/2022 | Koziolek | G06F 8/65 |
| 2022/0404799 A1* | 12/2022 | Amaro, Jr. | G06F 11/3409 |
| 2023/0169168 A1* | 6/2023 | Magen Medina | G06N 20/00 726/23 |

OTHER PUBLICATIONS

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-picfrom-controller-to-cloud-interface , retrieved on Nov. 29, 2021, pp. 1-6.

European Search Report for European Patent Application No. 21180068.5, dated Mar. 28, 2022,19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022,12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

Liu, Y. et al., "A Data-Centric Internet of Things Framework Based on Azure Cloud," IEEE Access, vol. 7, Mar. 27, 2019, 20 pages.

Extended European Search Report for Application No. 23198473.3 mailed Jan. 29, 2024, 10 pages.

* cited by examiner

SYSTEMS AND METHODS FOR CONDITION-BASED DEPLOYMENT OF CHAINABLE COMPUTE OPERATIONS FOR CONSTRAINED COMPUTING DEVICES

BACKGROUND

The present disclosure generally relates to systems and methods for implementing a container orchestration system in an operational technology (OT) network associated with one or more industrial automation systems. More particularly, embodiments of the present disclosure are related to systems and methods for leveraging container orchestration systems to identify and resolve conditions experienced by OT devices.

Industrial automation systems are managed and operated using automation control and monitoring systems (e.g., industrial control systems), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems operating in the OT environment are used to control industrial devices accessible via an OT network. When a device experiences a problem or condition, one or more containers may be deployed to the device to identify and/or remedy the problem or condition. However, in many cases, the device experiencing the problem or condition may not have sufficient resources to execute the containers to identify and/or remedy the problem or condition.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer readable medium stores instructions that, when executed by a processor, cause the processor to receive an indication of an event associated with an industrial automation system, wherein the industrial automation system includes a plurality of devices configured to perform a plurality of operations within the industrial automation system, and wherein each of the plurality of devices include a compute surface configured to perform one or more software tasks, determine a plurality of data processing tasks to perform based on the event, identify a portion of the plurality of devices to perform the plurality of data processing tasks based on the compute surface available for each of the plurality of devices, and deploy a container to each of the portion of the plurality of devices, wherein each container of each of the portion of the plurality of devices is configured to perform at least one of the plurality of data processing tasks.

In another embodiment, a method includes receiving, via one or more processors, an alert associated with an industrial automation system, wherein the industrial automation system includes a plurality of devices configured to perform a plurality of operations within the industrial automation system, and wherein each of the plurality of devices includes a respective compute surface configured to perform one or more software tasks, determining, via the one or more processors, a plurality of data processing tasks to perform based on the alert, identifying, via the one or more processors, a portion of the plurality of devices to perform the plurality of data processing tasks based on respective resources available to the respective compute surface available for each of the plurality of devices, generating, via the one or more processors, a data processing flow identifying one or more of the plurality of data processing tasks assigned to each of the portion of the plurality of devices, deploying, via the one or more processors, a plurality of containers to the portion of the plurality of devices, wherein each of the plurality of containers is configured to perform the one or more of the plurality of data processing tasks.

In a further embodiment, a non-transitory computer readable medium stores instructions that, when executed by a processor, cause the processor to receive an indication of an event associated with a device of a plurality of devices of an industrial automation system configured to perform a plurality of operations within the industrial automation system, determine a plurality of data processing tasks to perform based on the event, determine that the device does not have sufficient resources to perform the plurality of data processing tasks, identify a portion of the plurality of devices to perform the plurality of data processing tasks based on resources available for each of the plurality of devices, assign one or more of the plurality of data processing tasks to each of the portion of the plurality of devices, and transmit instructions to each of the portion of the plurality of devices to perform the assigned respective one or more of the plurality of data processing tasks.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

Figure 3:
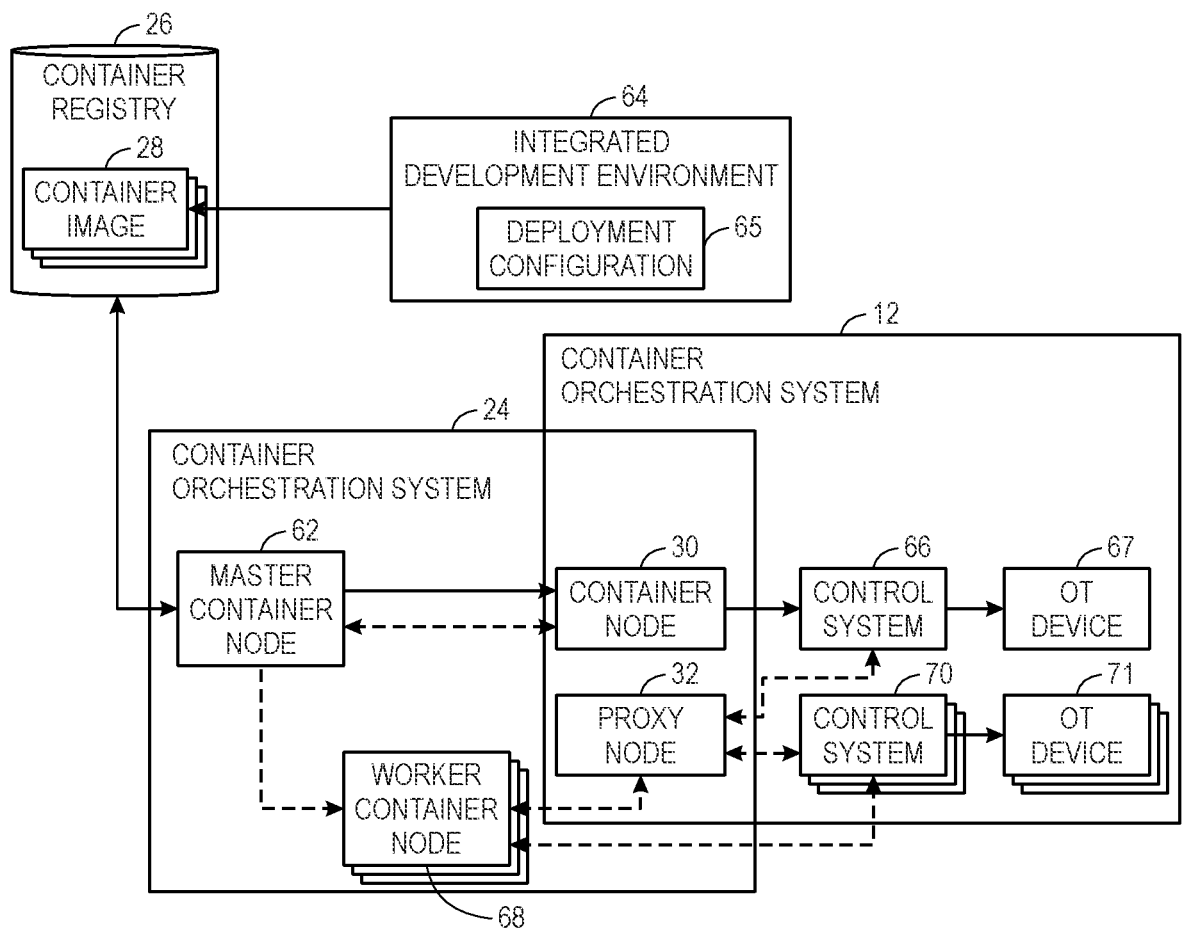
FIG. 3 is a block diagram of an example operational technology (OT) network that coordinates with a container orchestration system, in accordance with an embodiment.
Figure 7:
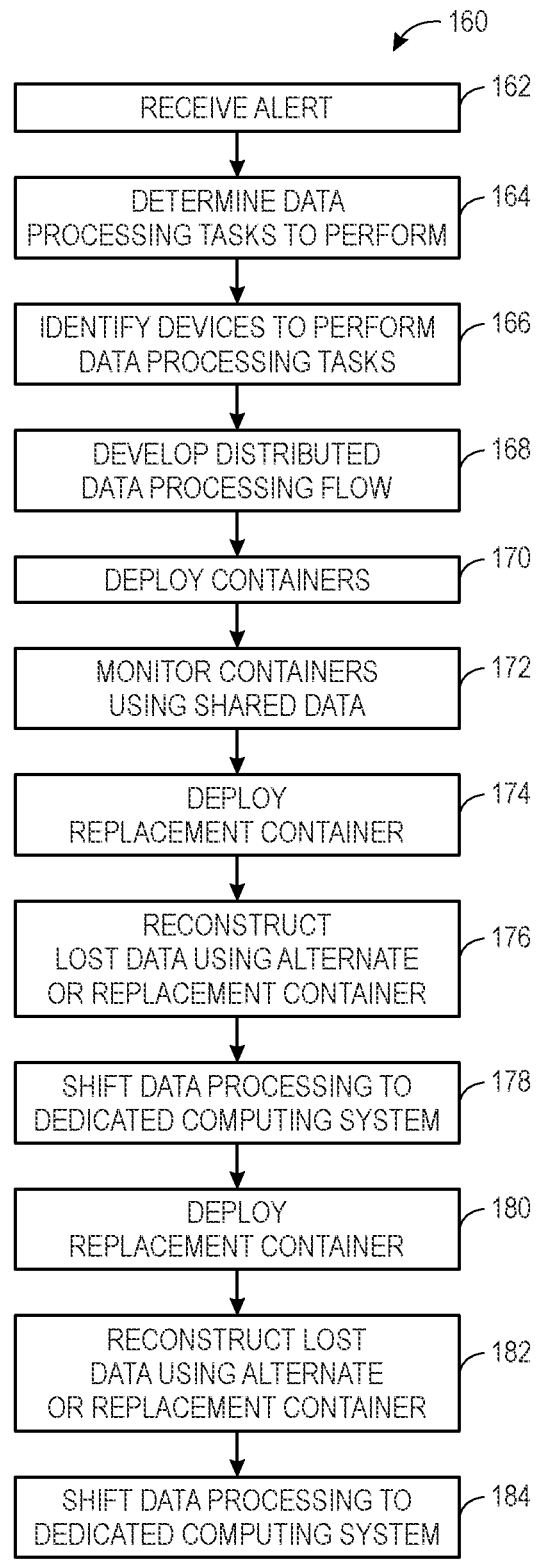
Figure 8:
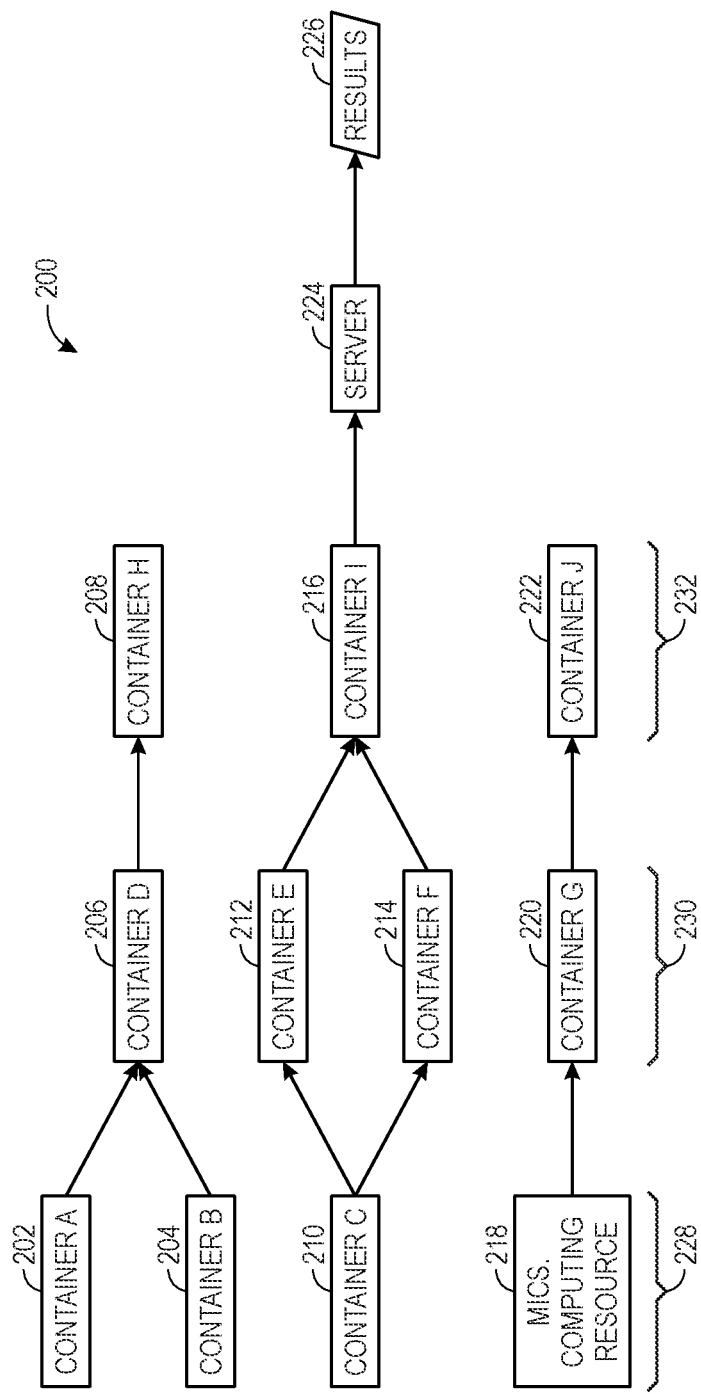

FIG. 7 is a flow chart of a method for condition-based deployment of chainable compute operations for constrained computing devices using the container orchestration system of FIG. 3, in accordance with an embodiment; and FIG. 8. is an embodiment of a data processing flow carried out by a set of distributed computing resources, such as the containers deployed by the container orchestration system of FIG. 3 in performance of the method shown in FIG. 7, in accordance with an embodiment;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed toward using distributed chainable compute to identify and/or remedy conditions experienced by devices in an industrial automation system that may not have sufficient resources to run containers for performing these functions locally. For example, an alert, alarm, or some other indication that a device is experiencing a condition or a problem may be received. Data processing tasks for identifying and/or remedying the condition or problem and devices for performing these tasks may be identified. In some embodiments, a distributed data processing flow may be generated that assigns tasks to particular devices, as well as a sequence for the data processing tasks. In some embodiments, devices may perform the same or different data processing tasks in parallel. Some data processing tasks may be performed on data sets resulting from multiple data processing tasks, performed in series or in parallel. Data processing tasks may be assigned to available computing resources using machine learning, analysis of historical data, running a script or an algorithm, matching data processing tasks with capabilities of available computing resources, etc. Containers may be deployed to the identified devices and utilized to execute the data processing flow. During operation, the containers may be monitored to make sure the containers are running in accordance with one or more container deployment files and/or the data processing flow. If a container experiences a problem, a replacement container may be deployed. If the failure of the container results in lost data, the replacement container may be used to recreate the lost data. The data processing tasks may be distributed among containers and other computing devices (e.g., edge devices, servers, desktop computers, laptop computers, tablets, mobile devices, human machine interfaces, industrial automation controllers, internet of things (IoT) devices, or any device having a processor, etc.). Accordingly, at some point in the data processing flow, data processing tasks may take place on computing resources that are not container-based. The data processing tasks may be performed to collect data from the industrial automation system experiencing the condition, diagnose the condition, identify one or more causes of the condition, and/or identify remedial actions to address the condition. Some remedial actions may be automatically implemented, whereas in other cases, remedial actions may be presented to a user for approval and/or implementation. If machine learning is used, collected data may be used as training data to train the machine learning model.

In some instances, to perform certain types of analysis, different types of data processing algorithms may be employed. That is, after detecting a certain type of alarm, a set of data processing tasks may be performed to identify the likely cause or resolution to the associated alarm. Keeping this in mind, the control systems and other OT devices present within the industrial automation system may have a limited amount of computing resources to perform the respective data processing tasks. As such, in some embodiments, certain data processing tasks may be performed across a number of computing resources available on various devices positioned within the industrial automation system. Indeed, each computing resource may perform a portion of the data processing tasks and provide resultant data to another computing resource to perform another portion of the data processing tasks. In another embodiment, parallel data processing tasks may be performed by multiple computing resources, such that the resultant datasets are provided to one or more additional computing resources to perform remaining data processing tasks.

With the foregoing in mind, it should be noted that a number of factors may be considered when identifying the computing surfaces/resources to employ in the chainable compute. Indeed, initially, a container deployment system may receive an alarm and determine that the available computing resources of a section of the industrial automation system has an insufficient amount of compute power, memory, network bandwidth, or other computing parameters. The container deployment system may then identify suitable computing surfaces available to perform a set of data processing tasks in a distributed fashion. As such, the container deployment system may deploy pods of containers to the identified computing surfaces to perform the distributed data processing tasks in a chainable compute fashion.

In some embodiments, the container deployment system may employ a machine learning algorithm to learn how the distributed data processing tasks should be deployed to various computing surfaces to determine the final solution more efficiently. In addition, the container deployment system may perform a number of data processing tasks until the remaining portion of the data processing tasks are performed by a server or dedicated computing system.

Additionally, by distributing data processing tasks, different containers may retain portions of the overall data analysis. In this way, if data is lost or corrupted in one container, the other containers may be employed to reconstruct the lost data based on the available datasets in the remaining containers.

Additional details with regard to condition-based deployment of chainable compute operations for constrained computing devices will be discussed below with reference to FIGS. 1-8.

Figure 1:
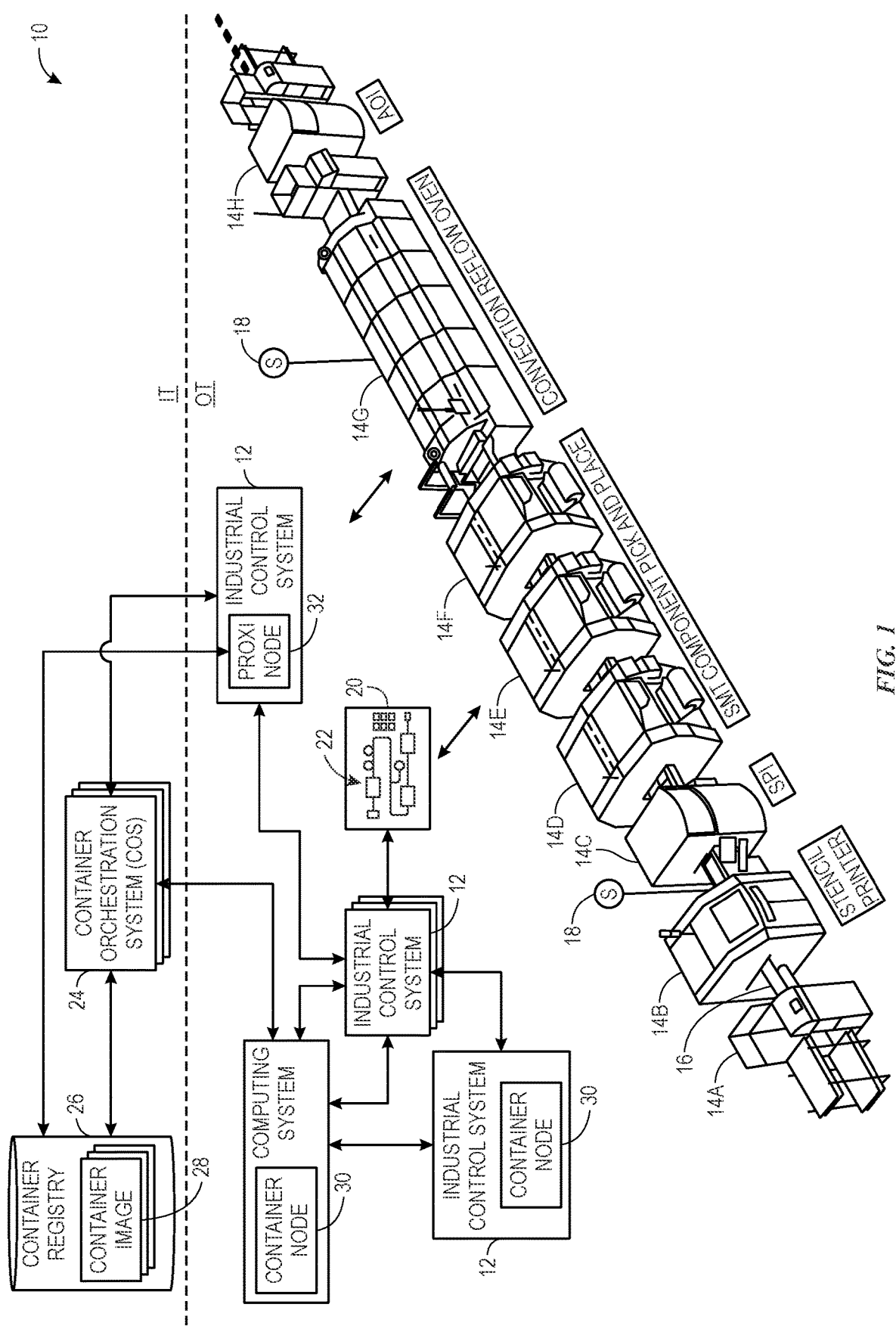
FIG. 1 is a perspective view of an example industrial automation system, in accordance with an embodiment.

By way of introduction, FIG. 1 is a perspective view of an example industrial automation system 10 controlled by one or more industrial control systems 12. The industrial automation system 10 includes stations 14A through 14H having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such as printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
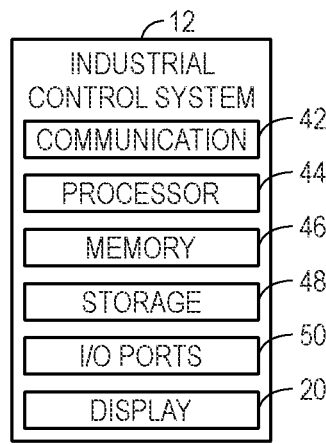
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master container node 62 may execute an applications programming interface (API) for the container orchestration system 24, a scheduler component, core resource controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk LiveData, EtherNet/IP. Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the master container node 62. The node agent may or may not be the same as the proxy node 32 shown in FIG. 1. For example, the industrial control system 12 may include a programmable logic controller (PLC) that cannot support an operating system (e.g., Linux) for receiving and/or implementing requested operations issued by the container orchestration system 12. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestration system 24 and the OT-based industrial control system 12.

Figure 4:
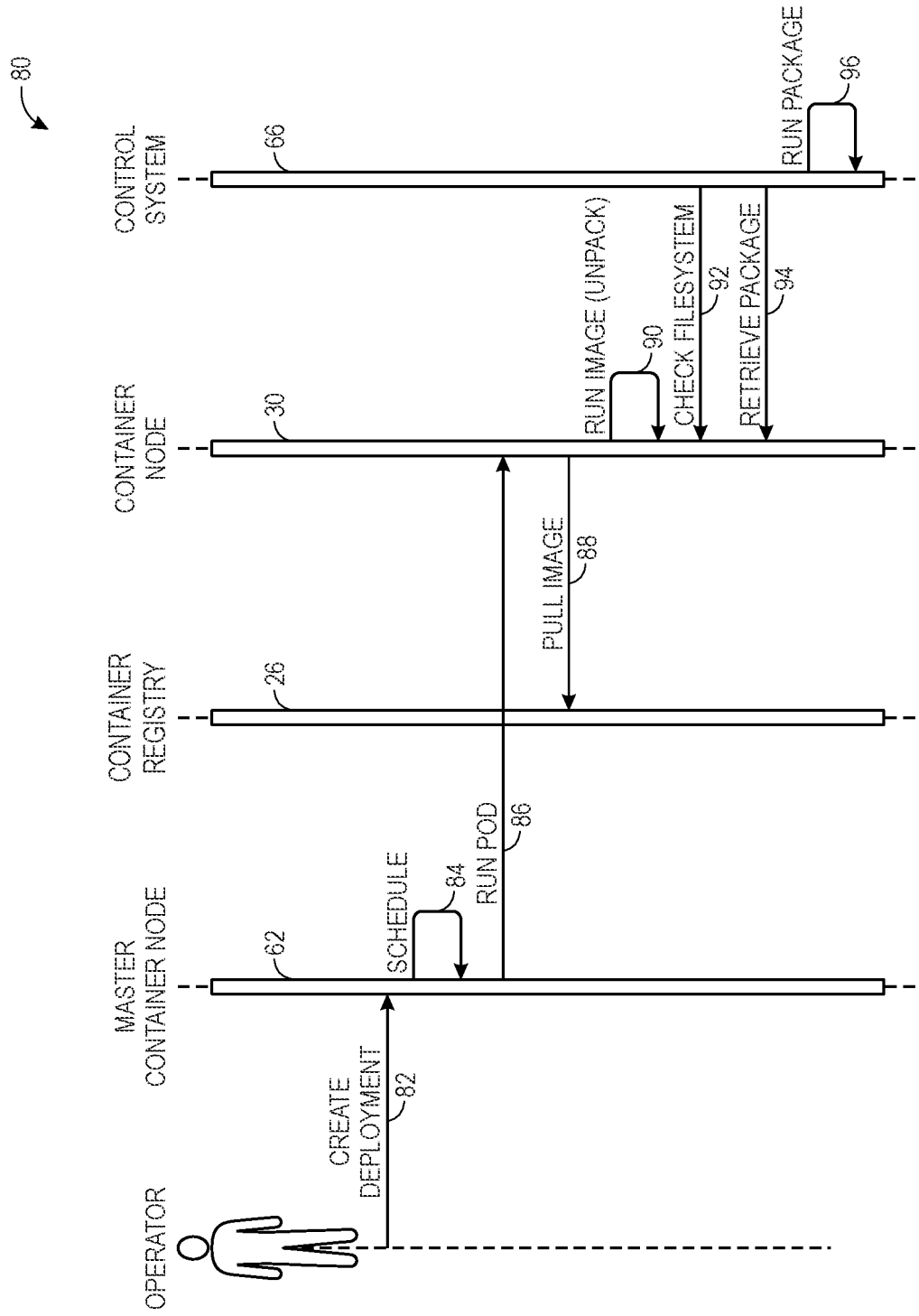
FIG. 4 is a sequence diagram illustrating the deployment of container pods to industrial control systems in the OT network of FIG. 3, in accordance with an embodiment.

FIG. 4 illustrates a sequence diagram 80 that tracks the deployment of a container using the master container node 62 and the container node 30 described above with reference to FIG. 3. At step 82, the IDE tool 64 may create a deployment of the deployment configuration file 65 to the master container node 62. After receiving the deployment configuration file 65, the master container node 62 may identify a container node 30 that may fit the constraint specifications (e.g., memory, CPU availability) provided in the deployment configuration file 65. That is, the master container node 62 performs scheduling operations that involve checking the state data for each node of the container orchestration system 24, determining whether a suitable node exists for the constraints provided in the deployment configuration file 65, and the like.

After identifying the suitable container node, at step 84, the master container node 62 may schedule the deployment of the container to the respective container node 30. At step 86, the master container node 62 may deploy a pod to the container node 30, which may cause the container node 30 to retrieve a container image 28 from the container registry 26 at step 88. In this way, the container node 30 is configured to receive pods from the master container node 62 and execute the pods, although the control system 66 of the industrial control system 12 may not be able to execute the pod. After pulling the container image 28 from the container registry 26, the container node 30 may, at step 90, run the container image 28 or unpack the container image 28 and store an application or operation executable by the control system 66 in a file system. At step 92, the control system 66 may check the file system of the container node 30 for updates or newly stored packages. At step 94, the control system 66 may retrieve the stored package that may include the container scheduled for operation by the control system 66 by the master container node 62 at step 84. At step 96, the control system 66 may execute the package retrieved from the file system of the container node 30. The container node 30 may then monitor the operations of the package being executed on the control system 66, the state (e.g., memory, CPU usage) of the control system 66 and send updates to the master container node 62. If the container node 30 sends an update indicative of the package no longer executing the package, the master container node 62 may schedule deployment of another pod to another container node 30 for execution to maintain the desired state.

Figure 5:
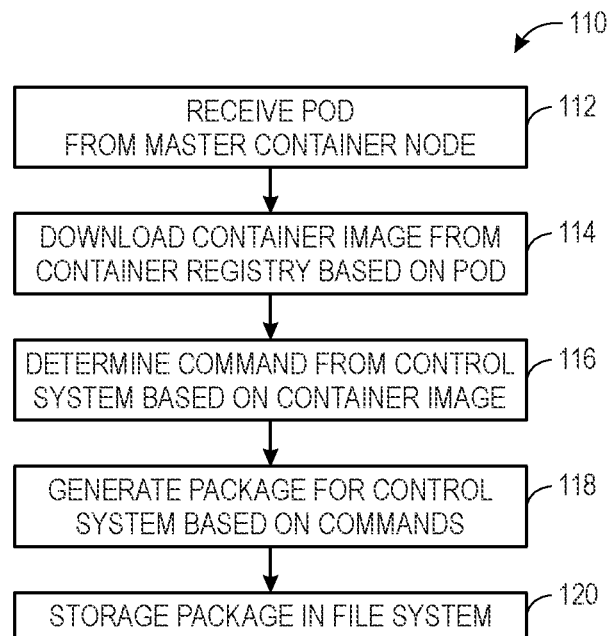
FIG. 5 is a flow chart of a method for the industrial control system passively implementing commands received via the control orchestration system, in accordance with an embodiment.

Keeping the foregoing in mind, FIG. 5 illustrates a method 110 in which the container node 30 may implement to coordinate activities via the master container node 62 of the container orchestration system 24. Although the following description of the method 110 is described as being performed by the container node 30, it should be understood that any suitable container node that is configured to interface with the cluster of nodes of the container orchestration system 24 and the industrial control system 12 may perform the operations described herein. In addition, although the method 110 is described in particular order, it should be understood that the method 110 may be performed in any suitable order.

Referring now to FIG. 5, at block 112, the container node 30 may receive a pod from the master container node 62. As mentioned above, pods may include one or more containers that are deployed to a host (e.g., container node 30). In some embodiments, the pod may operate to specify coordinated operations between a group of containers. The pod may include an indication or reference to a storage location for one or more container images 28 related to the pod. In some embodiments, the container images 28 may be stored in the container registry 26. As such, the pod may provide an indication of a network address or other address for accessing a memory location in the container registry 26.

After receiving the pod from the master container node 62, at block 114, the container node 30 may download the related container images 28 from the container registry 26. The container image 28, as mentioned above, represents data that encapsulates an application and its software dependencies. The container images 28 may be executable software bundles that may execute as standalone software without regard to the operating system that the corresponding container node 30 is using. In some embodiments, the container node 30 may receive the container images directly from the container registry 26, via the master container node 62, or any other suitable communication schemes.

After receiving the container images 28, at block 116, the container node 30 may run or unpack the container images 28 and determine commands that may be performed by the control system 66 based on the container images 28. That is, the container images 28 may include software applications that are executable by container nodes 30. However, the software applications may not be executable by the control system 66. As such, the container node 30 may determine commands for the control system 66 that correspond to the software applications encapsulated in the container images 28. In some embodiments, certain operations in the software applications may be mapped to certain operations that may be performed by the control system 66. For example, software application commands for create, run, start, pause, stop, and delete may map to download, download/run, run, idle, and unload commands, respectively, which may be performed by the control system 66. In some embodiments, the control system 66 may be used to perform a macro batch control sequence.

After determining the commands that may be implemented by the control system 66 based on the container images 28, at block 118, the container node 30 may generate a package that may be retrieved and executed by the control system 66. That is, the container node 30 may organize or structure the determined commands into a software package that may be used by the control system 66. For example, if the control system 66 corresponds to a PLC, the package may be organized according to a programming structure (e.g. ladder logic) that the PLC may use to program itself.

At block 120, the container node 30 may store the package in a memory or filesystem that is accessible to the control system 66. In some embodiments, the container node 30 may not be capable of interfacing directly with the control system 66. However, the container node 30 may provide the control system 66 with access to its memory or storage components, such that the control system 66 may retrieve the stored package. The control system 66 may be programmed to periodically (e.g., daily, hourly) check the filesystem for updates or new packages available for downloading.

It should be noted that the method 110 may describe a passive-indirect mode of operation for the container node 30 as part of the container orchestration system 24. That is, the container node 30 is limited to performing a subset of commands that may be provided by the master container node 62, as opposed to performing all of the commands that nodes that are part of the container orchestration system 24 are capable of performing. Moreover, the container node 30 may not be able to perform all of the lifecycle operations provided in a container. For example, the container node 30 may facilitate a package download operation for the control system 66, as described above, but it may not be able to perform every function specified in the container if the control system 66 does not have a corresponding operation that can be mapped to the respective container lifecycle operation.

In some embodiments, the container node 30 may operate in a passive-direct mode of operation in which the container node 30 may participate as a node in the container orchestration system 24. As such, the container node 30 may support a full set of container lifecycle operations. That is, since the control system 66 may be capable of implementing a limited set of commands provided by the master container node 62, the container node 30 may be implemented or executed by a sidecar compute module that may host a container host daemon that may perform the full suite of operations that a node in the container orchestration system 24 may perform. As such, the sidecar compute module may be any suitable computing system that is capable of executing an operating system (OS), such that commands received from the master container node 62 may be implemented by the respective sidecar compute module.

By implementing the container node 30 in the sidecar compute module, the container node 30 may be operating as a node that is part of the container orchestration system 24 but operating in the OT space. As a result, the container node 30 may extend the functions available via the container orchestration system 24 to OT devices 67 that are not typically visible to the master container node 62 of the container orchestration system 24. To operate in the passive-direct mode, the container node 30 may include applications and/or APIs that interface directly with the control system 66 and the master container node 62. As such, the container node 30 may provide a bi-directional bridge of communication between the control system 66 and the master container node 62. In some embodiments, the container node 30 may include an API that translates the OT data received from the control system 66 into IT data that may be interpretable by the master container node 62. As such, the container node 30 may provide the master container node 62 with visibility into the operations and states of the OT devices 67 operating in the OT space.

Figure 6:
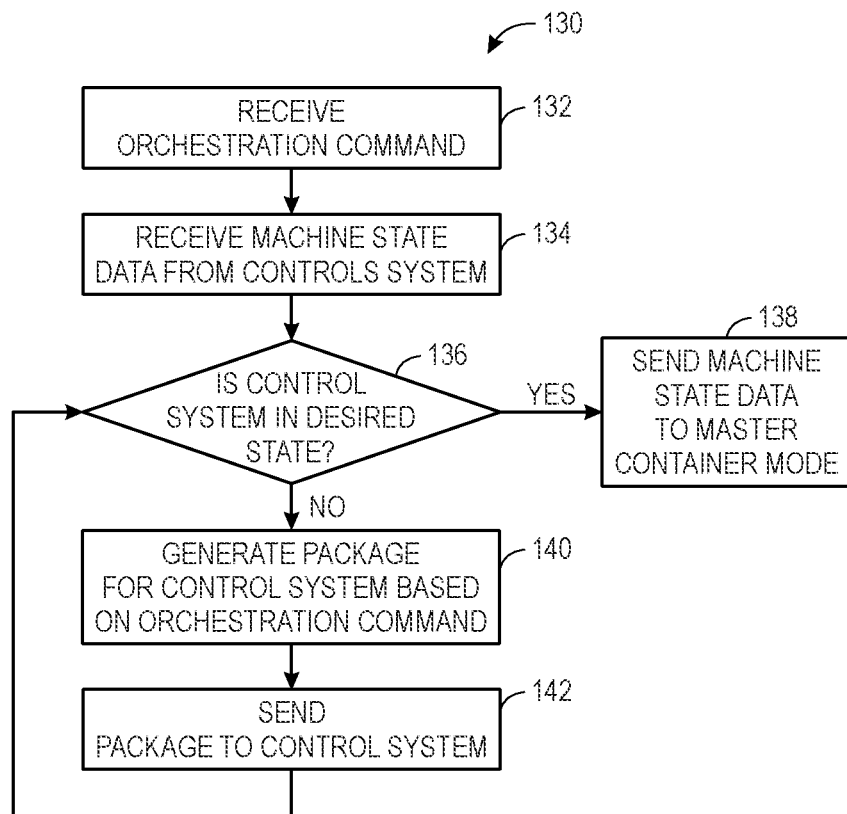
FIG. 6 is a flow chart of a method for the industrial control system actively implementing commands received via the control orchestration system, in accordance with an embodiment.

With this in mind, FIG. 6 illustrates a method 130 for the container node 30 directly sending packages to the control system 66 and machine state data to the master container node 62 in accordance with embodiments described herein. Like the method 110 described above, the following description of the method 130 may be performed by any suitable computing system and any suitable order. It should be noted that the method 130 described below corresponds to operating the container node 30 in the passive-direct mode of operation. As such, the container node 30 may receive and interpret orchestration commands received from the master container node 62 or the like and directly interface with the control system 66 to verify that the control system 66 is operating at the desired state.

Referring to FIG. 6, at block 132, the container node 30 may receive an orchestration command from the master container node 62 or some other node that is part of the container orchestration system 24. The orchestration command may include an instruction regarding one or more containers that the control system 66 should currently be executing. As such, the orchestration command may be part of a monitor function that causes the container node 30 to verify that the machine state data of the control system 66 corresponds to an expected machine state, as specified by the deployment configuration file 65.

At block 134, the container node 30 may retrieve machine state data from the control system 66. The machine state data may include current operational state (e.g., active, inactive) of the respective OT device controlled by the control system 66, available processing resources (e.g., CPU availability), available memory resources (e.g., storage, RAM), and the like. The machine state data may also indicate whether any containers are being executed by the control system 66. As such, the machine state data may be reported back to the master container node 62 to ensure that the desired state specified by the deployment configuration file 65 is present.

To receive the machine state data, the container node 30 may send requests to the control system 66 via an appropriate OT communication protocol. In response to receiving the requests, the control system 66 may query a database, memory cell, or other suitable storage that may include information regarding the requested data. After retrieving the requested information, the control system 66 may send the requested data to the container node 30 using the same OT communication protocol on which it received the request.

In some embodiments, the container node 30 may be embedded or integrated into one or more cores of the control system 66. As such, the container node 30 may communicate data with portions of the control system 66 using onboard communication methodologies. Alternatively, the container node 30 may directly retrieve the machine state data from the respective memory locations.

After receiving the machine state data from the control system 66, the container node 30 may, at block 136, determine whether the control system 66 is operating at a desired state based on the deployment configuration file 65. In the present embodiment, the container node 30 may evaluate whether the control system 66 is executing the containers, as specified in the deployment configuration file 65. That is, since the container node 30 may execute the container daemon host, the container node 30 may participate in the management of the containers distributed throughout the container orchestration system 24 by monitoring the machine state data of the control system 66.

If the control system 66 is operating in the desired state, the container node 30 may proceed to block 138 and send the machine state data to the master container node 62. The master container node 62 may then check whether other container nodes 30 are achieving the desire states.

If, however, the container node 30 determines that the control system 66 is not operating in the desired state, the container node 30 may proceed to block 140 and generate a package that may cause the control system 66 to modify its operations to execute the corresponding pod and the containers therein. After generating the package, the container node 30 may send the package directly to the control system 66 to execute. In this way, the container node 30 operates in the passive-direct mode because the container node 30 may directly send commands that cause the control system 66 to change operations. For example, instead of the control system 66 periodically checking the filesystem, as described above with respect to FIG. 5 (e.g., passive-indirect mode), the control system 66 may directly interface with the container node 30 and receive commands that may cause it to adjust operations of a connected device (e.g., OT device), execute received packages, and the like. As such, the container node 30 may push packages, firmware updates, OT device credential updates, security updates, encryption keys, and other data to the control system 66 at any given time. That is, the container system 30 may generate an event notification that causes an API or other component of the control system 66 to react in response to detecting the event notification. In other embodiments, the container node 30 may determine that it is safe to perform certain actions, such as changing state to download a firmware update, perform maintenance/service, etc. In this way, the container node 30 may actively participate in the coordination of containers with a respective control system 66 based on orchestration commands received passively from the master container node 62 or the like.

By employing the container nodes 30 to enable the container orchestration system 24 to implement software containers on control systems 66, the present embodiments described herein may allow for coordinating control of a number of control systems 66 and a number of OT devices 67 to control operations in the industrial automation system 10. That is, desired machine states may include desired operating parameters for industrial equipment, and the container orchestration system 24 may monitor the available industrial equipment resources to ensure that the desired machine states are continuously being achieved by coordinating activities via the container nodes 30 communicatively coupled to the control systems 66.

In addition to operating in the passive-indirect mode and the passive-direct mode, the container node 30 may operate in an active mode, such that the container node may invoke container orchestration commands for other container nodes 30. For example, referring back to FIG. 3, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 66 that is configured (e.g., partitioned), such that the control system 66 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 67 based on IT data. For instance, the proxy node 32 may acquire OT device tree data, state data for an OT device, descriptive metadata associated with corresponding OT data, versioning data for OT devices 67, certificate/key data for the OT device, and other relevant OT data via OT communication protocols. The proxy node 32 may then translate the OT data into IT data that may be formatted to enable the master container node 62 to extract relevant data (e.g., machine state data) to perform analysis operations and to ensure that the container orchestration system 24 and the connected control systems 66 are operating at the desired state. Based on the results of its scheduling operations, the master container node 62 may issue supervisory control commands to targeted OT devices via the proxy nodes 32, which may translate and forward the translated commands to the respective control system 66 via the appropriate OT communication protocol.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, referring to FIG. 3, the proxy node 32 may send instructions or pods to other worker container nodes 68 that may be part of the container orchestration system 24. The worker container nodes 68 may corresponds to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

Returning to FIG. 3, an OT device 67, 71 may experience a problem during operation and generate an alarm, an alert, or otherwise communicate that it is experiencing a problem. One or more containers may be deployed to the OT device 67, 71 or near the OT device 67, 71 to diagnose the problem and identify, recommend, and/or implement one or more remedial actions. However, in some embodiments, sufficient resources may not be available at or near the OT device 67, 71 to execute the containers. In such embodiments, data processing tasks may be broken up and performed using available computing resources within the industrial automation system. Accordingly, FIG. 7 is a flow chart of a method for condition-based deployment of chainable compute operations for constrained computing devices.

At block 162, an alert is received that is indicative of one or more devices, or a system, experiencing one or more problems or conditions. The alert may be generated by the device itself, a controller communicatively coupled to the device, an application-specific container monitoring operation of the device, a sensor monitoring one or more aspects of the device's performance of an industrial automation function or one or more conditions around the device, an edge device disposed in the OT network, a cloud-based computing device that monitors one or more aspects of the device, or some other device within the OT network. The alert may be triggered by a device or component ceasing to operate, a lack of communication from a device or component, communication of a problem or condition by a device or component, measured values falling above/below a threshold value, or outside of some anticipated range, a part or component breaking or seizing, a sensed condition, an unauthorized action or activity taking place, and the like.

At block 164, the process 160 identifies a set of data processing tasks may be performed to diagnose the condition causing the alert, identify the likely cause of the condition, and/or identify, and in some cases implement, one or more remedial actions to resolve the associated alert. This may involve, for example, accessing a lookup table, accessing a database, using a decision tree, using a machine learning or artificial intelligence (AI) model, analyzing historical data, and so forth. For example, data may be collected from a device as it continues to run after the alert has been transmitted and analyzed to diagnose the condition of the device and identify one or more remedial actions to address the condition. Additionally, data collected from the device in the time leading up to the alert may be analyzed to identify any anomalies or indications of the condition. Further, data may be collected from around the device (e.g., sensors and/or other devices upstream, downstream, or in the vicinity of the device) before the alert was issued, the time immediately before, during and after the alert was issued, or in the time following the alert, and analyzed to diagnose the condition. In some embodiments, scripts or algorithms may be run on collected data, the collected data may be compared to historical data, or the collected data may be provided to a machine learning model for analysis. Further supervised or unsupervised data analysis may be configured for feature extraction of conditions for which the system may or may not be monitored. For example, new data items may be recognized and collected during an operation that were not necessarily identified before the operation and then analyzed and utilized to improve the underlying process. In some embodiments, collected data may also be transmitted outside the OT network (e.g., to a remote server or a cloud-based computing device) for analysis.

At block 166, the process 160 identifies devices within the OT network to perform the identified data processing tasks. However, the control systems and other OT devices present within the industrial automation system may have a limited amount of computing resources (e.g., compute power, memory, network bandwidth, or other computing parameters) to perform the identified data processing tasks. As such, in some embodiments, certain identified data processing tasks may be distributed across a number of computing resources (e.g., containers, edge devices, servers, desktop computers, laptop computers, tablets, mobile devices, human machine interfaces, industrial automation controllers, internet of things (IoT) devices, or any device having a processor, etc.) available on various devices positioned within the industrial automation system. Indeed, each computing resource may perform a portion of the data processing tasks and provide resultant data to another computing resource to perform another portion of the data processing tasks. Accordingly, the process may identify suitable computing surfaces available to perform a set of data processing tasks in a distributed fashion.

At block 168, the process 160 generates a distributed data processing flow, which defines how the data processing tasks from block 164 are distributed among the computing resources identified in block 166. The data processing flow may be defined by one or more deployment configuration files. In some embodiments, the data processing tasks and the identified computing resources may be provided to a machine learning model that assigns data processing tasks to computing resources. In other embodiments, capabilities used to perform certain data processing tasks may be matched with computing resources having the capabilities. In further embodiments, lookup tables, databases, historical data, sets of data processing task assignment rules, and so forth may be used to determine which data processing tasks are assigned to what computing resources.

The distributed data processing flow may also define the order in which data processing tasks are performed. In some embodiments, the output of one or more first tasks acts as the input for one or more second tasks. Accordingly, the one or more first tasks may be scheduled to be performed before the one or more second tasks. However, in some cases, tasks may be performed in any order, and thus an order may not be defined by the distributed data processing flow. Along these lines, the distributed data processing flow may schedule multiple data processing tasks to take place in parallel. For example, a first computing resource may perform a first task at the same time that a second computing resource performs a second task. In some embodiments, the outputs of the first and second tasks may be provided as inputs to a third task being performed by a second computing resource. Additionally or alternatively, first and second computing resources may perform the same or similar tasks in parallel and the results compared. In other embodiments, the output of a data processing task may act as the input for multiple subsequent data processing tasks. Further, in some embodiments, multiple data processing tasks may be performed by a single computing resource, in series, in parallel, or some combination thereof.

At block 170, the process 160 (e.g., via a container orchestration system and/or container deployment system) deploys containers to the one or more computing devices identified at block 166. In some embodiments, pods of containers may be deployed that include various combinations of containers, having different roles/purposes, and configured to coordinate to perform a particular task or group of tasks. If tasks are assigned to computing resources that may or may not be executing containers, instructions may be provided to the computing resources or devices to perform the assigned data processing tasks. In some embodiments, the coordination between containers and/or other computing resources may be using chainable compute. As used herein chainable compute refers to a set of distributed computing resources that are capable of transmitting data between one another. Accordingly, a first computing resource may receive data from one or more second computing resources, perform one or more data processing operations on the received data, and then output results of the data processing operations to one or more third computing resources. As such, sequences of data processing operations may be broken up into tasks, or sets of tasks, and assigned to specific computing resources within the set of distributed computing resources, which coordinate to complete the sequence of data processing operations.

As described above, deploying a container may include, for example, transmitting a container image to a device, compute surface, computing resource, etc. The container image defines various characteristics of the container and how the container is to run. The device, compute surface, computing resource, etc. executes the container image in order to execute the container. During operation, the containers may receive data from another container or computing resource, perform one or more data processing tasks, and then transmit the results of the data processing tasks to back to the container from which the data was received or transmit the resultant data to another container or computing resource for completion of additional tasks.

At block 172, the process 160 (e.g., via the container orchestration system) monitors the containers performing the one or more data processing tasks. This may include, for example, collecting data from containers themselves, inspecting data transmitted between containers, and so forth, and comparing the data to one or more container deployment files. If a container, or a device executing a container, encounters a problem and either the container or the device executing a container is unable to continue to operate as set forth in the container deployment file, the process (e.g., via the container orchestration system) may deploy a replacement container, either to the same device or a different device. In some embodiments, the container orchestration system may utilize collected data from the failed container and provide the data to the replacement container so the replacement container can resume activities being performed by the failed container. However, in some embodiments, failure of the container may result in lost data. In such cases, the replacement container may be utilized to reconstruct the lost data by performing tasks previously performed by the failed container. Because data processing tasks are distributed, different containers may retain different portions of the overall data analysis. In this way, if data is lost or corrupted in one container, the other containers may be employed to reconstruct the lost data based on the available datasets in the remaining containers.

At block 178, the process 160 may shift one or more data processing tasks to a dedicated computing system (e.g., a server). Though some or most of the distributed data processing tasks are performed by containers, in some embodiments, at one or more points in the data processing, some or all of the data processing tasks may be shifted to a dedicated computing device. In the instant embodiment, the dedicated computing device may be used to receive data from the various containers and other computing resources that performed data processing tasks in the distributed data processing flow and aggregate and/or assemble results of the distributed data processing. However, in other embodiments, a dedicated computing device may be used to perform pre-processing before data is distributed to the containers and various other computing resources, or to perform tasks in the middle of the distributed data processing, especially tasks that utilize significant computing resources, such as training and/or applying machine learning models.

If the process utilizes machine learning or artificial intelligence, in some embodiments, data collected during the process 160 may be utilized to generate training data (block 180) for training a machine learning or AI-based model (block 182), which may or may not be part of the process 160 shown in FIG. 7. At block 184, the containers are spun down. For example, the container orchestration system may transmit instructions to the devices or other computing surfaces executing the containers to stop executing the containers and make computing resources utilized by the containers available for other purposes.

With the foregoing in mind, FIG. 8 represents an example of a data processing flow 200 carried out by a set of distributed computing resources. As shown, container A 202 and container B 204 receive, retrieve, collect, or generate data, perform computing tasks (e.g., data processing tasks) and provide the resultant data to container D 206 (e.g., for higher-level system related data processing). The computing tasks performed by container A 202 and container B 204 may be the same or similar computing task happening in parallel, or different computing tasks happening in parallel. Container D 206, receives data from container A 202 and container B 204, performs one or more computing tasks on the received data, and then transmits the resultant data to container H 208. If container A 202 and container B 204 perform the same or similar computing tasks in parallel, the computing tasks performed by container D 206 may include comparing the data received from container A 202 and container B 204. However, if container A 202 and container B 204 perform different computing tasks, then the computing tasks performed by container D 206 may include utilizing the data received from container A 202 and container B 204, and/or combining the received data to perform some subsequent computing tasks. Container H 208 may perform additional computing tasks on the data received from container D 206 and then transmit the resultant data to a dedicated computing system, such as a server 224.

Meanwhile, container C 210 may receive data, perform one or more computing tasks on the received data, and transmit the resultant data to both container E 212 and container F 214. Container E 212 and container F 214 may perform one or more computing tasks on the data received from container C 210 and then transmit the resultant data to container I 216. In some embodiments, container C 210 may transmit the same data to container E 212 and container F 214 to perform the same computing tasks in parallel. However, in other embodiments, container E 212 and container F 214 may perform different computing tasks on the same data, such as applying different models to the same data set. In further embodiments, container E 212 and container F 214 may receive different data from container C 210 and perform different computing tasks on the received data. Container I 216 may perform additional computing tasks (e.g., for higher-level system related data processing) on the data received from container E 212 and container F 214 and then transmit the resultant data to the server 224.

Meanwhile, a miscellaneous computing resource 218 (e.g., a container, an edge device, a server, a desktop computer, a laptop computer, a tablet, a mobile device, a human machine interface, an industrial automation controller, an internet of things (IoT) device, or any device having a processor) may perform one or more computing tasks on a data set and provide the resultant data to container G 220, which performs one or more computing tasks on the received data and transmits the resultant data to container J 222. Container J 222 performs one or more computing tasks on the received data and transmits the resultant data to the server 224. The server 224 may then aggregate or otherwise combine the data received from container H 208, container I 216, and container J 222. In some embodiments, the server 224 may perform one or more additional computing tasks and output a set of results 226.

As previously discussed, the computing tasks performed by the distributed computing resources may be in response to an alert or a condition being detected within an industrial automation system. Accordingly, computing tasks performed by the distributed resources may be related to data acquisition, data processing/analysis, diagnosing conditions, identifying a cause of the alert/condition, identifying remedial actions, and so forth. Accordingly, in the data processing flow 200 shown in FIG. 8, computing resources in section 228 perform data acquisition related tasks, computing resources in section 230 perform condition diagnosis and causal analysis related tasks, and computing resources in section 232 perform tasks related to identifying remedial actions.

For example, computing resources in section 228 may be deployed after an alert is received to collect additional data, analyze collected data, and process or pre-process collected data. This may include, for example, generating signatures (e.g., motor signatures), identifying events, identifying anomalous data, filtering data, comparing collected data between devices or to historical data displaying known patterns, etc.

Computing resources in section 230 may be deployed to further analyze collected data to diagnose conditions and/or identify causes of alerts/conditions. This may include, for example, applying machine learning models, accessing historical data, accessing publicly available data, providing data to a service provider, comparing collected data to data collected from devices that display known patterns, and so forth.

Computing resources in section 232 may be deployed to identify and/or recommend remedial actions to address the diagnosed conditions. This may include, for example, applying machine learning models, accessing historical data, accessing publicly available data, referencing service data and/or product manuals, etc. Remedial actions may include, for example, changing operating parameters, replacing a part or component, performing a maintenance operation, restarting a device, updating software/firmware, scheduling service with a technician, etc. In some embodiments, remedial actions may be automatically implemented. In other embodiments, remedial actions may be presented to a user (e.g., for approval, to be performed manually, etc.).

However, in other embodiments, the data processing flow 200 of FIG. 8 may depict containers disposed in a hierarchy, or reflect a hierarchy of the underlying devices that execute the containers. Accordingly, in such an embodiment, data may flow up a hierarchy of devices and/or containers of the OT network such that a container receives data from containers and/or devices that are below it in the hierarchy and consolidates the received data before passing the consolidated data further up the hierarchy.

Accordingly, the set of computing tasks performed by the distributed computing resources shown in FIG. 8 may be distributed among a set of computing resources running on various devices. Accordingly, it should be understood that the computing resources shown in FIG. 8 may be running on any number of devices and/or compute surfaces. Accordingly, in some embodiments, the computing resources may be running on a single device, the computing resources may be distributed across multiple devices, or each of the computing resources may be running on its own compute surface or device.

It should be understood that the data processing flow 200 shown in FIG. 8 is merely an example design to illustrate how different distributes computing resources may coordinate to perform a set of computing tasks. However, it should be understood that embodiments having different arrangements of distributed computing resources coordinating in different ways are also envisaged. Accordingly, the embodiment of the data processing flow 200 shown in FIG. 8 is not intended to limit the scope of the claimed subject matter.

The presently disclosed techniques include using distributed chainable compute to identify and/or remedy conditions experienced by devices in an industrial automation system that may not have sufficient resources to run containers for performing these functions locally. For example, an alert, alarm, or some other indication that a device is experiencing a condition or a problem may be received. Data processing tasks for identifying and/or remedying the condition or problem. If the device experiencing the condition does not have sufficient resources to perform the identified data processing tasks locally, devices for performing these tasks may be identified. In some embodiments, a distributed data processing flow may be generated that assigns tasks to particular devices, as well as a sequence for the data processing tasks. In some embodiments, devices may perform the same or different data processing tasks in parallel. Some data processing tasks may be performed on data sets resulting from multiple data processing tasks, performed in series or in parallel. Data processing tasks may be assigned to available computing resources using machine learning, analysis of historical data, running a script or an algorithm, matching data processing tasks with capabilities of available computing resources, etc. Containers may be deployed to the identified devices and utilized to execute the data processing flow. During operation, the containers may be monitored to make sure the containers are running in accordance with one or more container deployment files and/or the data processing flow. If a container experiences a problem, a replacement container may be deployed. If the failure of the container results in lost data, the replacement container may be used to recreate the lost data. The data processing tasks may be distributed among containers and other computing devices (e.g., edge devices, servers, desktop computers, laptop computers, tablets, mobile devices, human machine interfaces, industrial automation controllers, internet of things (IoT) devices, or any device having a processor, etc.). Accordingly, at some point in the data processing flow, data processing tasks may take place on computing resources that are not container-based. The data processing tasks may be performed to collect data from the industrial automation system experiencing the condition, diagnose the condition, identify one or more causes of the condition, and/or identify remedial actions to address the condition. Some remedial actions may be automatically implemented, whereas in other cases, remedial actions may be presented to a user for approval and/or implementation. If machine learning is used, collected data may be used as training data to train the machine learning model. By using the disclosed techniques, available computing resources throughout the industrial automation system may be utilized to perform data processing tasks to diagnose and remedy conditions experienced by one or more devices within the industrial automation system, even if a single one of the devices experiencing the condition does not have sufficient resources to perform the data processing tasks locally. Accordingly, the disclosed techniques enable the data processing tasks to diagnose and remedy conditions to be performed by an architecture of computing resources that would otherwise not have been able to perform the data processing tasks without having to settle for performing only some of the data processing tasks, acquire additional computing resources to perform the data processing tasks, or repurpose existing computing resources to perform the data processing tasks. Accordingly, the disclosed techniques improve the efficiency of use of computing resources within the industrial automation system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer readable medium storing instructions that, when executed by a processor, cause the processor to perform actions comprising:
   receiving an indication of an event associated with an industrial automation system, wherein the industrial automation system comprises a plurality of devices configured to perform a plurality of operations within the industrial automation system, and wherein each of the plurality of devices comprises a compute surface configured to perform one or more software tasks;
   determining a plurality of data processing tasks to perform based on the event;
   identifying a portion of the plurality of devices to perform the plurality of data processing tasks based on the compute surface available for each of the plurality of devices; and
   deploying a container to each of the portion of the plurality of devices, wherein each container of each of the portion of the plurality of devices is configured to perform at least one of the plurality of data processing tasks, and wherein at least one of each container deployed to each of the portion of the plurality of devices is configured to:
      receive resultant data from at least two additional containers of each container deployed to the portion of the plurality of devices; and
      compare the resultant data received from the at least two additional containers of each container deployed to the portion of the plurality of devices.

2. The non-transitory computer readable medium of claim 1, wherein at least two of the containers deployed to the portion of the plurality of devices are configured to perform parallel data processing tasks.

3. The non-transitory computer readable medium of claim 2, wherein the parallel data processing tasks are the same.

4. The non-transitory computer readable medium of claim 2, wherein the parallel data processing tasks are different from one another.

5. The non-transitory computer readable medium of claim 1, wherein the at least one of the containers deployed to the portion of the plurality of devices is configured to:
 combine the resultant data received from a first container and a second container of the at least two of the containers deployed to the portion of the plurality of devices; and
 transmit the combined resultant data to a third container deployed to a device of the portion of the plurality of devices.

6. The non-transitory computer readable medium of claim 1, wherein the instructions, when executed by the processor, cause the processor to perform the actions comprising:
 receiving an indication that one of the deployed containers has stopped executing; and
 deploy a replacement container, wherein the replacement container is configured to reconstruct data lost as a result of the one of the deployed containers stopping execution.

7. The non-transitory computer readable medium of claim 1, wherein deploying the container to each of the portion of the plurality of devices comprises deploying a pod of containers, wherein the pod of containers comprises a plurality of containers configured to coordinate to perform one or more of the plurality of data processing tasks.

8. A method, comprising:
 receiving, via one or more processors, an alert associated with an industrial automation system, wherein the industrial automation system comprises a plurality of devices configured to perform a plurality of operations within the industrial automation system, and wherein each of the plurality of devices comprises a respective compute surface configured to perform one or more software tasks;
 determining, via the one or more processors, a plurality of data processing tasks to perform based on the alert;
 identifying, via the one or more processors, a portion of the plurality of devices to perform the plurality of data processing tasks based on respective resources available to the respective compute surface available for each of the plurality of devices;
 generating, via the one or more processors, a data processing flow identifying one or more of the plurality of data processing tasks assigned to each of the portion of the plurality of devices; and
 deploying, via the one or more processors, a plurality of containers to the portion of the plurality of devices, wherein each of the plurality of containers is configured to perform the one or more of the plurality of data processing tasks, and wherein at least one the plurality of containers deployed to the portion of the plurality of devices is configured to:
  receive resultant data from at least two additional containers of the plurality of containers deployed to the portion of the plurality of devices; and
  compare the resultant data received from the at least two additional containers of the plurality of containers.

9. The method of claim 8, wherein the plurality of containers comprises a data acquisition container configured to collect data from the industrial automation system.

10. The method of claim 8, wherein the plurality of containers comprises a condition identification container configured to identify a condition associated with the alert based on data collected from the industrial automation system.

11. The method of claim 8, wherein the plurality of containers comprises a causal analysis container configured to identify a cause associated with the alert based on data collected from the industrial automation system.

12. The method of claim 8, wherein the plurality of containers comprises a remedial action identification container configured to identify a remedial action to remedy a condition associated with the alert based on data collected from the industrial automation system.

13. The method of claim 12, comprising: transmitting for display via a graphical user interface (GUI), an indication of the identified remedial action to remedy the condition associated with the alert.

14. The method of claim 13, comprising: receiving, via the GUI, an input approving the remedial action.

15. The method of claim 12, comprising: automatically implementing the identified remedial action.

16. The method of claim 12, wherein the remedial action comprises adjusting one or more operating parameters, replacing a part, replacing a component, performing a maintenance operation, restarting a device of the plurality of devices, updating software, updating firmware, scheduling service, scheduling maintenance, or any combination thereof.

17. A non-transitory computer readable medium storing instructions that, when executed by a processor, cause the processor to perform actions comprising:
 receiving an indication of an event associated with a device of a plurality of devices of an industrial automation system configured to perform a plurality of operations within the industrial automation system;
 determining a plurality of data processing tasks to perform based on the event;
 determining that the device does not have sufficient resources to perform the plurality of data processing tasks;
 identifying a portion of the plurality of devices to perform the plurality of data processing tasks based on resources available for each of the plurality of devices;
 assigning one or more of the plurality of data processing tasks to each of the portion of the plurality of devices; and
 deploying a container to each of the portion of the plurality of devices, wherein each container of each of the portion of the plurality of devices is configured to perform a respective one or more of the plurality of data processing tasks, and wherein at least one of each container deployed to each of the portion of the plurality of devices is configured to:
  receive resultant data from at least two additional containers of each container deployed to the portion of the plurality of devices;
  combine the resultant data; and
  transmit the combined resultant data to a third container of each container deployed to the portion of the plurality of devices.

18. The non-transitory computer readable medium of claim 17, wherein the instructions, when executed by the processor, cause the processor to perform the actions comprising: determining that the device does not have sufficient computing resources to perform the plurality of operations.

\* \* \* \* \*